United States Patent
Walton et al.

(10) Patent No.: US 11,991,222 B1
(45) Date of Patent: May 21, 2024

(54) PERSISTENT CALL CONTROL USER INTERFACE ELEMENT IN AN ARTIFICIAL REALITY ENVIRONMENT

(71) Applicant: Meta Platforms Technologies, LLC, Menlo Park, CA (US)

(72) Inventors: Ryan Walton, San Francisco, CA (US); Jonathan Smiley, Campbell, CA (US); Ryan Alexander Chavez, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/310,589

(22) Filed: May 2, 2023

(51) Int. Cl.
  *H04L 65/1093* (2022.01)
  *H04L 65/403* (2022.01)
  *H04M 3/56* (2006.01)
  *H04N 7/15* (2006.01)

(52) U.S. Cl.
  CPC ........ *H04L 65/1093* (2013.01); *H04L 65/403* (2013.01); *H04M 3/568* (2013.01); *H04N 7/157* (2013.01)

(58) Field of Classification Search
  CPC .. H04L 65/1093; H04L 65/403; H04M 3/568; H04N 7/157
  See application file for complete search history.

(56) References Cited

U.S. PATENT DOCUMENTS

| | | |
|---|---|---|
| 6,842,175 B1 | 1/2005 | Schmalstieg et al. |
| 7,701,439 B2 | 4/2010 | Hillis et al. |
| 8,558,759 B1 | 10/2013 | Prada Gomez et al. |
| 8,836,768 B1 | 9/2014 | Rafii et al. |
| 8,947,351 B1 | 2/2015 | Noble |
| 9,117,274 B2 | 8/2015 | Liao et al. |

(Continued)

FOREIGN PATENT DOCUMENTS

| | | |
|---|---|---|
| EP | 3155560 A1 | 4/2017 |
| EP | 3155560 B1 | 5/2020 |

(Continued)

OTHER PUBLICATIONS

International Search Report and Written Opinion for International Application No. PCT/US2023/017990, dated Jul. 10, 2023, 9 pages.

(Continued)

*Primary Examiner* — Adnan M Mirza
(74) *Attorney, Agent, or Firm* — Potomac Law Group, PLLC; Dannon G. Allbee

(57) ABSTRACT

Aspects of the present disclosure relate to orchestrating calls with an "active call bar" for an artificial reality (XR) environment displayed on an XR device, with a control bar for voice calls that persists across XR experiences. From the active call bar, a user can create a voice call with other users on XR devices, end the call, manage participants of the call, adjust the volume of the call, etc. The user can further see which XR experiences the other users within the party are accessing, and can invite them to join their XR experience. As the user moves between experiences and applications, the active call bar can persist on the user interface. Further, the user can continue the voice call across different experiences regardless of where other users are, i.e., users do not have to be co-located in the same experience to participate in the voice call.

18 Claims, 11 Drawing Sheets

(56) References Cited

U.S. PATENT DOCUMENTS

| | | |
|---|---|---|
| 9,292,089 B1 | 3/2016 | Sadek |
| 9,477,303 B2 | 10/2016 | Fleischmann et al. |
| 9,477,368 B1 | 10/2016 | Filip et al. |
| 9,817,472 B2 | 11/2017 | Lee et al. |
| 10,042,430 B2 | 8/2018 | Bedikian et al. |
| 10,220,303 B1 | 3/2019 | Schmidt et al. |
| 10,248,284 B2 | 4/2019 | Itani et al. |
| 10,473,935 B1 | 11/2019 | Gribetz et al. |
| 10,521,944 B2 | 12/2019 | Sareen et al. |
| 10,595,011 B2 * | 3/2020 | Han .................. H04N 13/327 |
| 11,221,730 B2 | 1/2022 | Murphy et al. |
| 11,307,671 B2 | 4/2022 | Liu et al. |
| 11,514,650 B2 | 11/2022 | Kim et al. |
| 2008/0089587 A1 | 4/2008 | Kim et al. |
| 2009/0077504 A1 | 3/2009 | Bell et al. |
| 2010/0306716 A1 | 12/2010 | Perez |
| 2011/0239155 A1 | 9/2011 | Christie |
| 2011/0267265 A1 | 11/2011 | Stinson |
| 2012/0069168 A1 | 3/2012 | Huang et al. |
| 2012/0071892 A1 | 3/2012 | Itkowitz et al. |
| 2012/0113223 A1 | 5/2012 | Hilliges et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0218183 A1 | 8/2012 | Givon et al. |
| 2012/0218395 A1 | 8/2012 | Andersen et al. |
| 2012/0249740 A1 | 10/2012 | Lee et al. |
| 2012/0249741 A1 | 10/2012 | Maciocci et al. |
| 2012/0275686 A1 | 11/2012 | Wilson et al. |
| 2012/0293544 A1 | 11/2012 | Miyamoto et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0182902 A1 | 7/2013 | Holz |
| 2013/0265220 A1 | 10/2013 | Fleischmann et al. |
| 2014/0007484 A1 | 1/2014 | Erdoss et al. |
| 2014/0125598 A1 | 5/2014 | Cheng et al. |
| 2014/0204002 A1 | 7/2014 | Bennet et al. |
| 2014/0236996 A1 | 8/2014 | Masuko et al. |
| 2014/0306891 A1 | 10/2014 | Latta et al. |
| 2014/0357366 A1 | 12/2014 | Koganezawa et al. |
| 2014/0375691 A1 | 12/2014 | Kasahara |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0110285 A1 | 4/2015 | Censo et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0243100 A1 | 8/2015 | Abovitz et al. |
| 2015/0261659 A1 | 9/2015 | Bader et al. |
| 2015/0269783 A1 | 9/2015 | Yun |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0378291 A1 | 12/2016 | Pokrzywka |
| 2017/0050542 A1 | 2/2017 | Shigeta et al. |
| 2017/0060230 A1 | 3/2017 | Faaborg et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0228130 A1 | 8/2017 | Palmaro |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0337742 A1 | 11/2017 | Powderly et al. |
| 2017/0364198 A1 | 12/2017 | Yoganandan et al. |
| 2018/0004283 A1 | 1/2018 | Mathey-Owens et al. |
| 2018/0046245 A1 | 2/2018 | Schwarz et al. |
| 2018/0059901 A1 | 3/2018 | Gullicksen |
| 2018/0107278 A1 | 4/2018 | Goel et al. |
| 2018/0113599 A1 | 4/2018 | Yin |
| 2018/0303446 A1 | 10/2018 | Schweizer |
| 2018/0307303 A1 | 10/2018 | Powderly et al. |
| 2018/0322701 A1 | 11/2018 | Pahud et al. |
| 2018/0323992 A1 | 11/2018 | Harms et al. |
| 2018/0329492 A1 | 11/2018 | Coppin et al. |
| 2018/0335925 A1 | 11/2018 | Hsiao et al. |
| 2018/0357780 A1 | 12/2018 | Young et al. |
| 2019/0050071 A1 | 2/2019 | Liu et al. |
| 2019/0057531 A1 | 2/2019 | Sareen et al. |
| 2019/0094981 A1 | 3/2019 | Bradski et al. |
| 2019/0107894 A1 | 4/2019 | Hebbalaguppe et al. |
| 2019/0120593 A1 | 4/2019 | Randles |
| 2019/0129607 A1 * | 5/2019 | Saurabh .................. G06F 3/011 |
| 2019/0130653 A1 | 5/2019 | Kuehne |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0347865 A1 | 11/2019 | Hackett et al. |
| 2019/0361521 A1 | 11/2019 | Stellmach et al. |
| 2019/0362562 A1 | 11/2019 | Benson |
| 2019/0369391 A1 | 12/2019 | Cordesses et al. |
| 2019/0377416 A1 | 12/2019 | Alexander |
| 2020/0012341 A1 | 1/2020 | Stellmach et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0129850 A1 | 4/2020 | Ohashi |
| 2020/0218423 A1 | 7/2020 | Ohashi |
| 2020/0225736 A1 | 7/2020 | Schwarz et al. |
| 2020/0225758 A1 | 7/2020 | Tang et al. |
| 2020/0225830 A1 | 7/2020 | Tang et al. |
| 2020/0226814 A1 | 7/2020 | Tang et al. |
| 2020/0379576 A1 | 12/2020 | Chen et al. |
| 2021/0076091 A1 | 3/2021 | Shohara |
| 2021/0096726 A1 | 4/2021 | Faulkner et al. |
| 2021/0373672 A1 | 12/2021 | Schwarz et al. |
| 2023/0040610 A1 | 2/2023 | Buerli et al. |
| 2023/0274512 A1 | 8/2023 | Terre et al. |

FOREIGN PATENT DOCUMENTS

| | | | |
|---|---|---|---|
| EP | 4145397 A1 * | 3/2023 | ............. G06F 3/013 |
| JP | 2015100032 A | 5/2015 | |
| KR | 20120136719 A | 12/2012 | |
| WO | 2017009707 A1 | 1/2017 | |
| WO | 2018235371 A1 | 12/2018 | |
| WO | 2019245681 A1 | 12/2019 | |

OTHER PUBLICATIONS

Argelaguet F., et al., "A Survey of 3D Object Selection Techniques for Virtual Environments," Computers & Graphics, 2013, vol. 37, No. 3, pp. 121-136.

Cardoso J., "Comparison of Gesture, Gamepad, and Gaze-Based Locomotion for VR Worlds," Proceedings of the 22nd ACM Conference on Virtual Reality Software and Technology, Nov. 2, 2016, pp. 319-320.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/051763, dated Mar. 31, 2022, 10 pages.

International Search Report and Written Opinion for International Application No. PCT/US2020/051763, dated Feb. 3, 2021, 11 Pages.

International Search Report and Written Opinion for International Application No. PCT/US2021/063536 dated Mar. 22, 2022, 12 pages.

Lee M.S., et al., "A Computer Vision System for on-Screen Item Selection by Finger Pointing," In Proceedings of the 2001 IEEE

(56) References Cited

OTHER PUBLICATIONS

Computer Society Conference on Computer Vision and Pattern Recognition (CVPR), 2001, vol. 1, 8 pages.

Mardanbegi D., et al., "Eyesee Through: Unifying Tool Selection and Application in Virtual Environments," In 2019 IEEE Conference on Virtual Reality and 3D User Interfaces (VR), 2019, pp. 474-483.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Mine M.R., et al., "Moving Objects in Space: Exploiting Proprioception in Virtual-Environment Interaction," In Proceedings of the 24th Annual Conference on Computer Graphics and Interactive Techniques, 1997, pp. 19-26.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Pfeuffer, et al., "Gaze+ Pinch Interaction in Virtual Reality," ACM, 2017, SUI '17, Brighton, United Kingdom, Oct. 16, 2017, 10 pages.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

Tomberlin M., et al., "Gauntlet: Travel Technique for Immersive Environments using Non-Dominant Hand," IEEE Virtual Reality (VR), Mar. 18, 2017, pp. 299-300.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Fox B., et al., "Designing Singlehanded Shortcuts for VR & AR," May 10, 2018, Retrieved from the Internet: URL: https://www.roadtovr.com/leap-motion-designing-single-handed-shortcuts-for-vr-ar/, [Retrieved on Oct. 27, 2020], 18 pages.

Huang Y., et al., "Evaluation of a Hybrid of Hand Gesture and Controller Inputs in Virtual Reality," International Journal of Human-Computer Interaction, Aug. 26, 2020, vol. 37, No. 2, pp. 169-180.

International Search Report and Written Opinion of International Application No. PCT/US2020/035998, dated Sep. 30, 2020, 16 pages.

Lang B., "Leap Motion Virtual Wearable AR Prototype is a Potent Glimpse at the Future of Your Smartphone," Mar. 24, 2018, Retrieved from the Internet: URL: https://www.roadtovr.com/leap-motion-virtual-wearable-ar-prototype-glimpse-of-future-smartphone/, [Retrieved on Oct. 27, 2020], 6 pages.

Matsuda K., "Augmented City 3D [Official]," YouTube, Aug. 20, 2010, Retrieved from the Internet: URL: https://www.youtube.com/watch?v=3TL80ScTLIM, 1 page.

Newton A., "Immersive Menus Demo," YouTube, Oct. 8, 2017, Retrieved from the Internet: URL: https://www.youtube.com/watch?v=_ow1RboHJDY, 1 page.

Office Action dated Sep. 19, 2023 for European Patent Application No. 20747255.6, filed on Dec. 7, 2021, 6 pages.

Prosecution History of U.S. Appl. No. 16/434,919, dated Apr. 2, 2020 through Dec. 15, 2020, 46 pages.

\* cited by examiner

PERSISTENT CALL CONTROL USER INTERFACE ELEMENT IN AN ARTIFICIAL REALITY ENVIRONMENT

TECHNICAL FIELD

The present disclosure is directed to orchestrating calls and user interactions, with a persistent call control user interface element, in an artificial reality (XR) environment.

BACKGROUND

Artificial reality (XR) devices are becoming more prevalent. As they become more popular, the applications implemented on such devices are becoming more sophisticated. Augmented reality (AR) applications can provide interactive 3D experiences that combine images of the real-world with virtual objects, while virtual reality (VR) applications can provide an entirely self-contained 3D computer environment. For example, an AR application can be used to superimpose virtual objects over a video feed of a real scene that is observed by a camera. A real-world user in the scene can then make gestures captured by the camera that can provide interactivity between the real-world user and the virtual objects. Mixed reality (MR) systems can allow light to enter a user's eye that is partially generated by a computing system and partially includes light reflected off objects in the real-world. AR, MR, and VR (together XR) experiences can be observed by a user through a head-mounted display (HMD), such as glasses or a headset.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
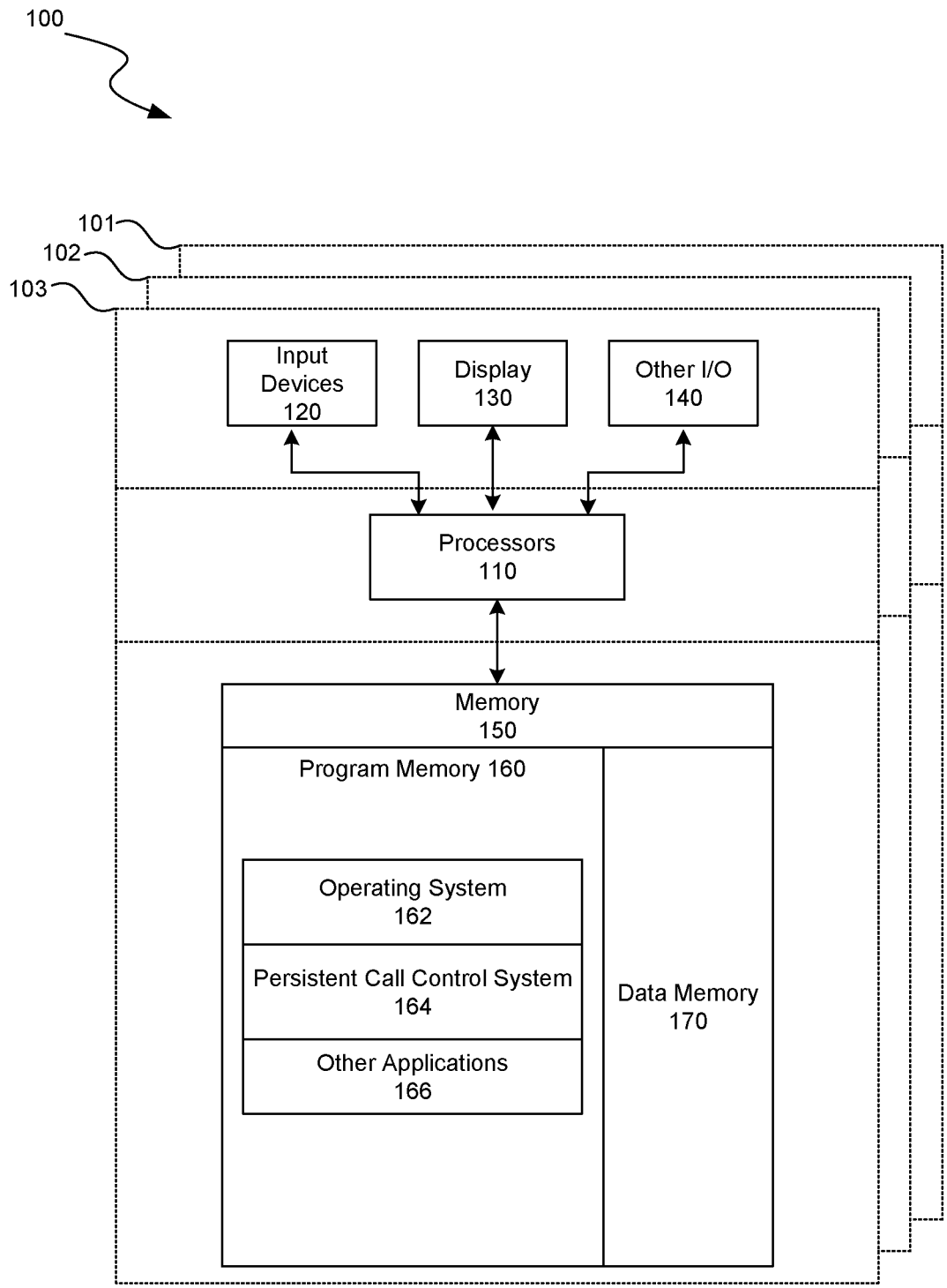
FIG. 1 is a block diagram illustrating an overview of devices on which some implementations of the present technology can operate.

Aspects of the present disclosure relate to orchestrating calls and user interactions, with an "active call bar," for an artificial reality (XR) environment, i.e., a user interface element, displayed on an XR device, with a control bar for voice calls that persists across experiences. From the active call bar, a user can create a voice call with other users on XR devices, end the call, manage participants of the call, adjust the volume of the call, etc. The user can further see which XR experiences the other users within the party are accessing, and can invite them to join their XR experience. As the user moves between experiences and applications, the active call bar can persist on the user interface. Further, the user can continue the voice call across different experiences regardless of where other users are, i.e., users do not have to be co-located in the same experience to participate in the voice call.

For example, a user can be within an XR home experience on her XR device, and invite her friends to join an audio call. Once the audio call is initiated, the XR device can display an overlay having a set of controls for the audio call. For example, the overlay can allow the user to control the volume of the audio call, turn on and off her microphone, control where her audio is output (e.g., in the XR home experience and/or to her friends on the audio call, etc.), invite her friends to join her in the XR home experience, etc. The friends within the audio call can be within the same XR home experience as the user, can travel to join the user in her XR home experience, or can be within different XR experiences. The user can then select a menu option to display other XR experiences, and select a new XR experience to travel to, such as an XR baseball experience. The audio call with her friends can persist from the XR home experience into the XR baseball experience, as well as the overlay with call options, such that the user does not have to end the call in the home experience and restart the call in the baseball experience, in order to access and control the call.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The implementations described herein provide specific improvements in the field of artificial reality (XR) in that they allow an audio call and controls for the audio call to persist across travel to different XR experiences. Conventionally, users must manually coordinate to move between applications together if they want to maintain an audio call. For example, to speak to each other across different applications, users must form a party in one application (i.e., make a formal association between the users indicating to a computing system hosting that application that they should be kept together), start an audio call in that application, close that application and audio call, open another application, and reform their party and call in the other application, in order to continue speaking with their group.

Aspects of the present disclosure address these problems and others by facilitating persistent audio calls, with displayed audio controls, across XR experiences. To maintain the audio call and its controls, the users within the call need not be within the same XR experience, or stay within a particular XR experience, and instead can be in different XR experiences, as well as travel across XR experiences. Further, aspects of the present disclosure do not require users to formally form a party within each XR experience they access. Implementations can allow users to maintain the audio call and the call controls while traveling between virtual worlds, levels, or even applications seamlessly, even if such XR experiences are hosted by different computing systems. The implementations described herein are necessarily rooted in computing technology (i.e., XR technology) to overcome a problem specifically arising in the realm of computer networks, e.g., persistent communication and control of an audio call between disparate XR devices accessing different XR experiences (that may be even associated with different developers).

Several implementations are discussed below in more detail in reference to the figures. FIG. 1 is a block diagram illustrating an overview of devices on which some implementations of the disclosed technology can operate. The devices can comprise hardware components of a computing system 100 that can orchestrate calls and user interactions, with a persistent call control user interface element, in an artificial reality (XR) environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, persistent call control system 164, and other application programs 166. Memory 150 can also include data memory 170 that can include, e.g., XR experience data, rendering data, audio data, call control data, overlay data, input data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
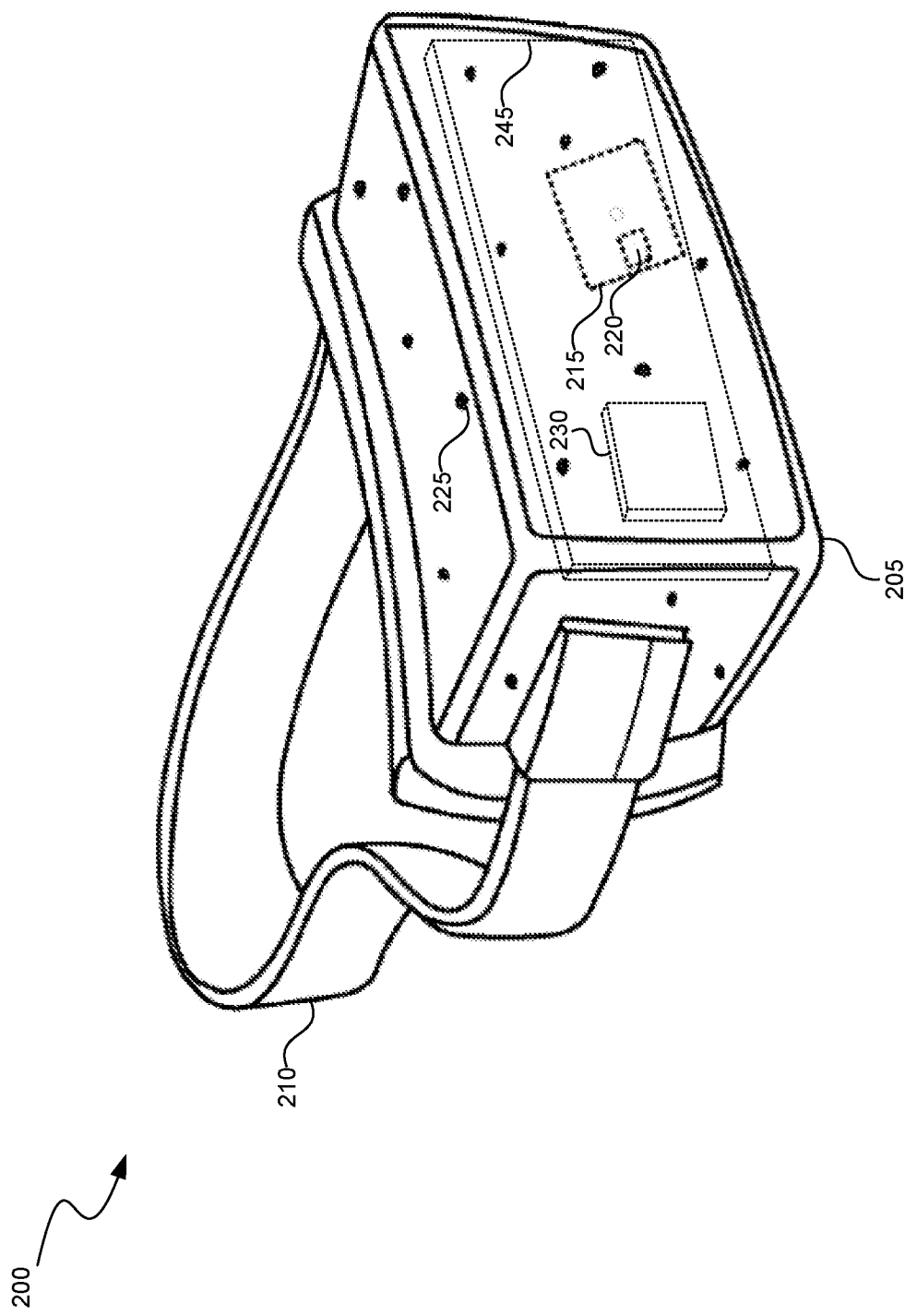
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
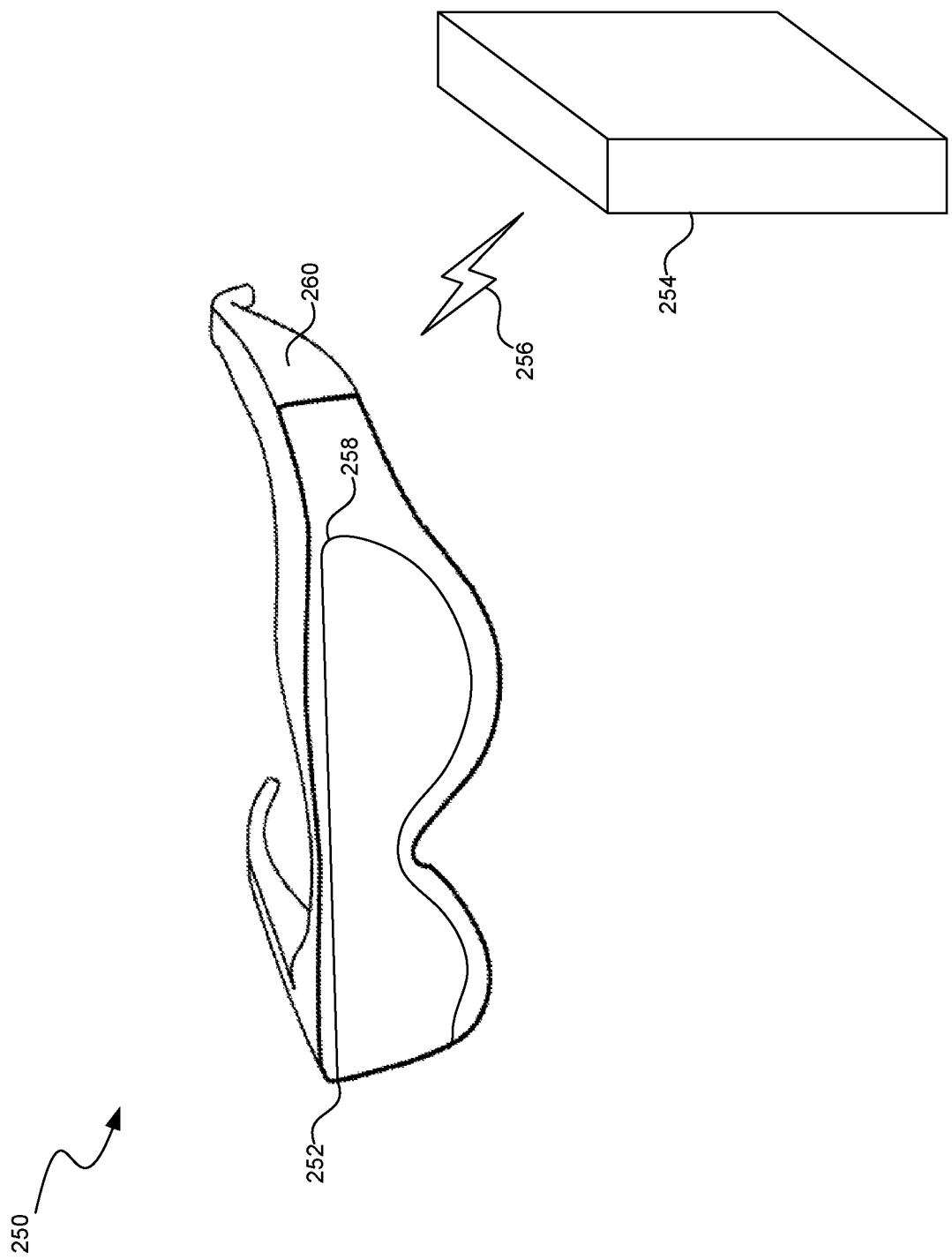
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
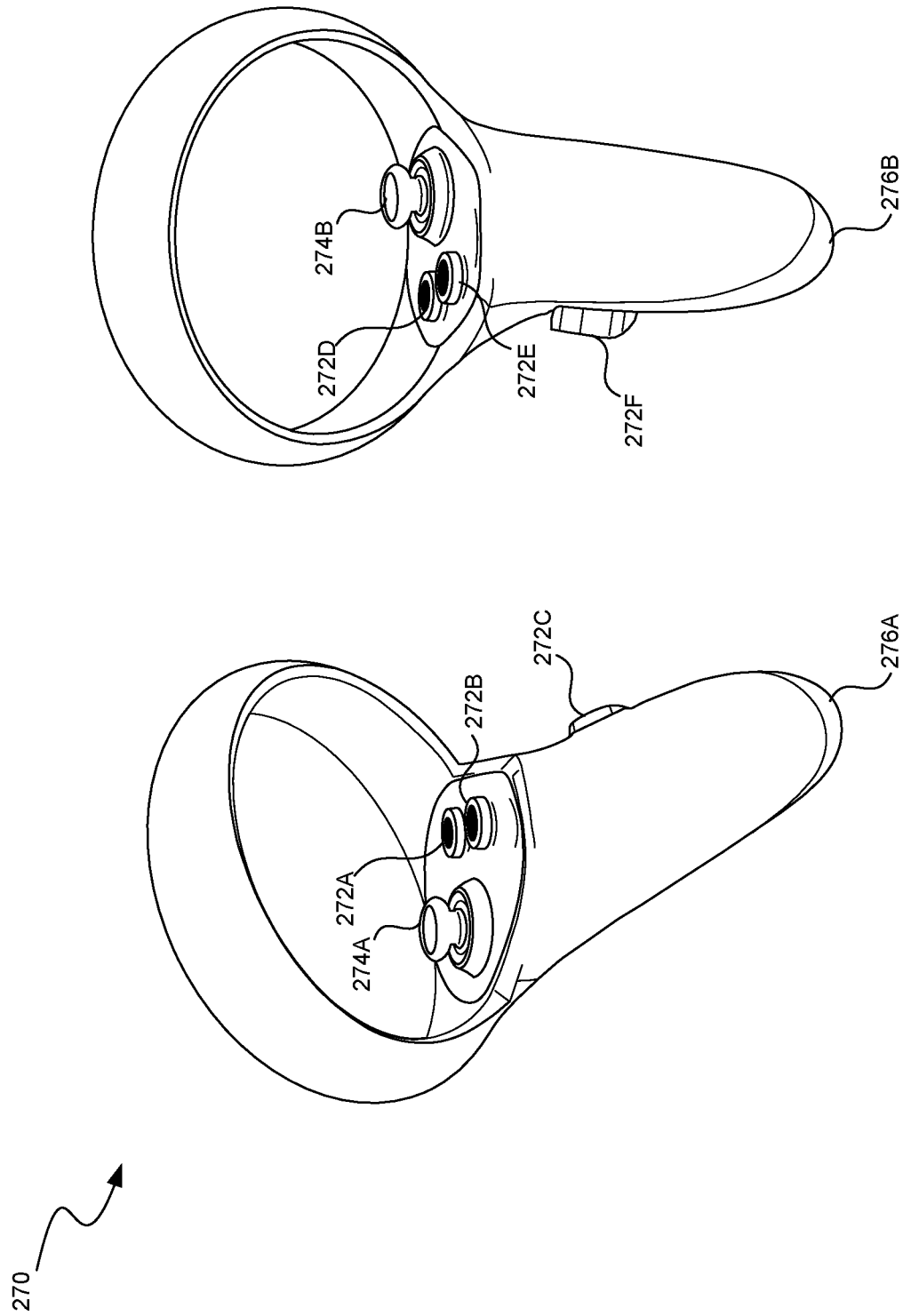
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
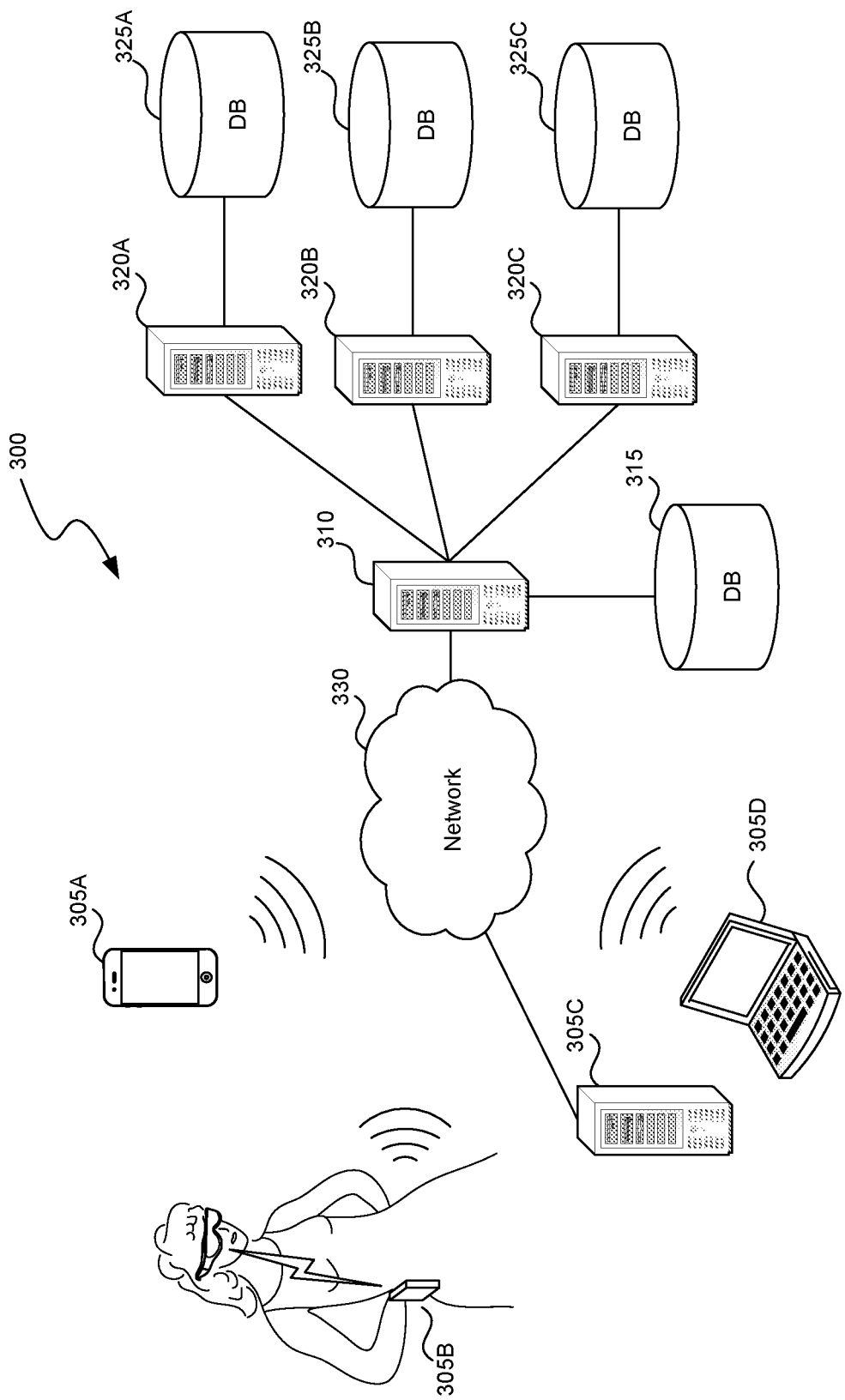
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
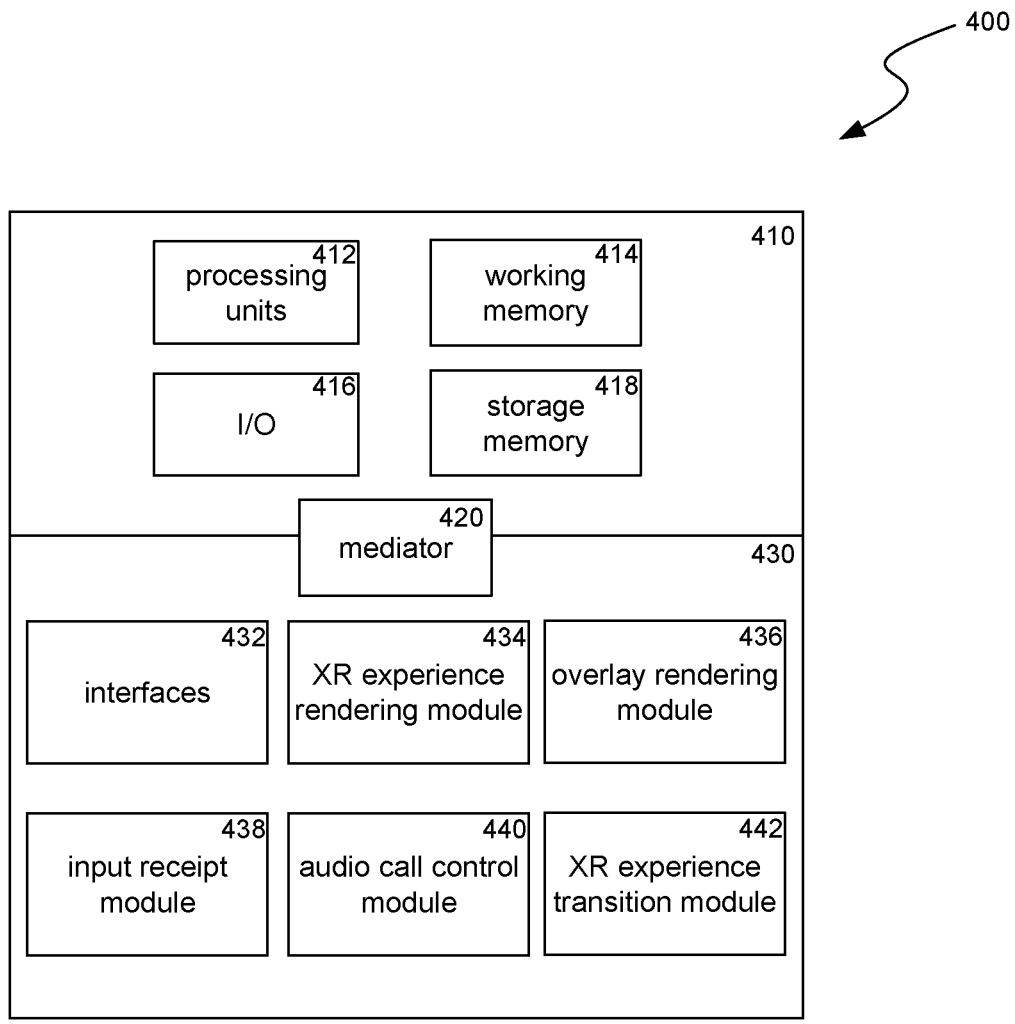
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for orchestrating calls and user interactions, with a persistent call control user interface element, in an artificial reality (XR) environment. Specialized components 430 can include XR experience rendering module 434, overlay rendering module 436, input receipt module 438, audio call control module 440, XR experience transition module 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

XR experience rendering module 434 can render XR experiences for a user on an XR device. In some implementations, XR experience rendering module 434 can render the XR experiences based on input selecting particular XR experiences, such as input received by input receipt module 438. XR experience rendering module 434 can render the XR experiences by, for example, controlling lighting effects applied to a display of the XR device, in order to generate a fully immersive three-dimensional (3D) XR environment. Further details regarding rendering XR experiences for a user on an XR device are described herein with respect to blocks 502 and 508 of FIG. 5.

Overlay rendering module 436 can render an overlay on the XR device, while the user of the XR device is accessing XR experiences rendered by XR experience rendering module 434. The overlay can include a set of controls for controlling the audio call, between the user of the XR device and one or more other users of respective other XR devices, that persists amongst XR experiences while the user (and the other users) access and/or travel to and from the same or different XR experiences. In some implementations, the set of controls can display identifiers associated with the other users in the audio call (e.g., their names, usernames, descriptions, geographic locations, demographic data, avatars, etc.). In some implementations, the set of controls can include audio controls, such as muting or unmuting a microphone on the XR device for the audio call, controlling where audio captured by the microphone is output (e.g., in an XR experience, in an audio call, or both), controlling volume for the audio call, controlling balancing of audio being received from or transmitted to the audio call and/or the XR experience, terminating the audio call, etc. In some implementations, the set of controls can allow the user to invite other users to join the audio call, and/or to invite other users within the audio call to join the XR experience being accessed by the user. In some implementations, the set of controls can allow the user to share his view on the XR device with another user within the audio call, i.e., allow the other user to "follow" the user within the accessed XR experience. Further details regarding rendering an overlay, on an XR device, including a set of controls for an audio call, are described herein with respect to block 504 of FIG. 5.

Input receipt module 438 can receive input, via the XR device, to travel to between XR experiences. From within a first XR experience, for example, the XR device can display a menu of other available XR experiences to which the user can travel, such as other experiences installed on the XR device, other experiences installed by other users within the audio call, etc. The user can use the XR device to select an available XR experience via any suitable method detectable by the XR device. For example, in some implementations, input receipt module 438 can receive gesture input indicating that the user has made a particular motion with his hand(s) indicative of an intent to travel to another XR experience. In some implementations, input receipt module 438 can detect the gesture input via one or more cameras integral with or in operable communication with the XR device, via an electromyography (EMG) sensor, via one or more sensors of an inertial measurement unit (IMU), etc. In some implementations, input receipt module 438 can receive controller input indicating that the user has selected a virtual portal or button associated with another XR experience, such as by pointing a virtual hand or ray cast by the controller at the virtual portal or button, and selecting a physical button on the controller. In some implementations, input receipt module 438 can receive audio input indicating that the user intends to travel to another XR experience, such as through an audible announcement. In some implementations, input receipt module 438 can further receive input, via the XR device, to access and/or set user controls displayed by overlay rendering module 436, which can be routed to audio call control module 440. Further details regarding receiving input from a user via an XR device are described herein with respect to block 506 of FIG. 5.

Audio call control module 440 can facilitate a system-level audio call, between the user and one or more other users accessing the same or different XR experiences via respective XR devices, that can persist across different XR experiences. Audio call control module 440 can further, based on input received by input receipt module 438, control the audio call between the user of the XR device and the one or more other users on respective other XR devices. For example, overlay rendering module 436 can render the set of controls for controlling the audio call, which can include, for example, muting the microphone, adjusting the volume, adjusting the call balance, etc., as described further herein. Input receipt module 438 can receive input corresponding to a control of the set of controls, and can route the input and its corresponding location (e.g., corresponding to a particular displayed control) to audio call control module 440. Audio call control module 440 can then control the audio call based on the type and location of the input relative to a call control rendered by overlay rendering module 436.

XR experience transition module 442 can transition the user of the XR device between XR experiences, based on input received by input receipt module 438. For example, XR experience transition module 442 can close a first XR experience rendered by XR experience rendering module 434, and instruct XR experience rendering module 434 to render a second XR experience. While transitioning between the first XR experience and the second XR experience, XR experience transition module 442 can instruct audio call control module 440 to maintain the audio call, and can instruct overlay rendering module 436 to continue rendering the overlay. Thus, overlay rendering module 436, audio call control module 440, and XR experience transition module 442 can ensure that the overlay and the audio call persist across different XR experiences, and even during travel between different XR experiences. Further details regarding transitioning a user to another XR experience based on input are described herein with respect to block 508 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
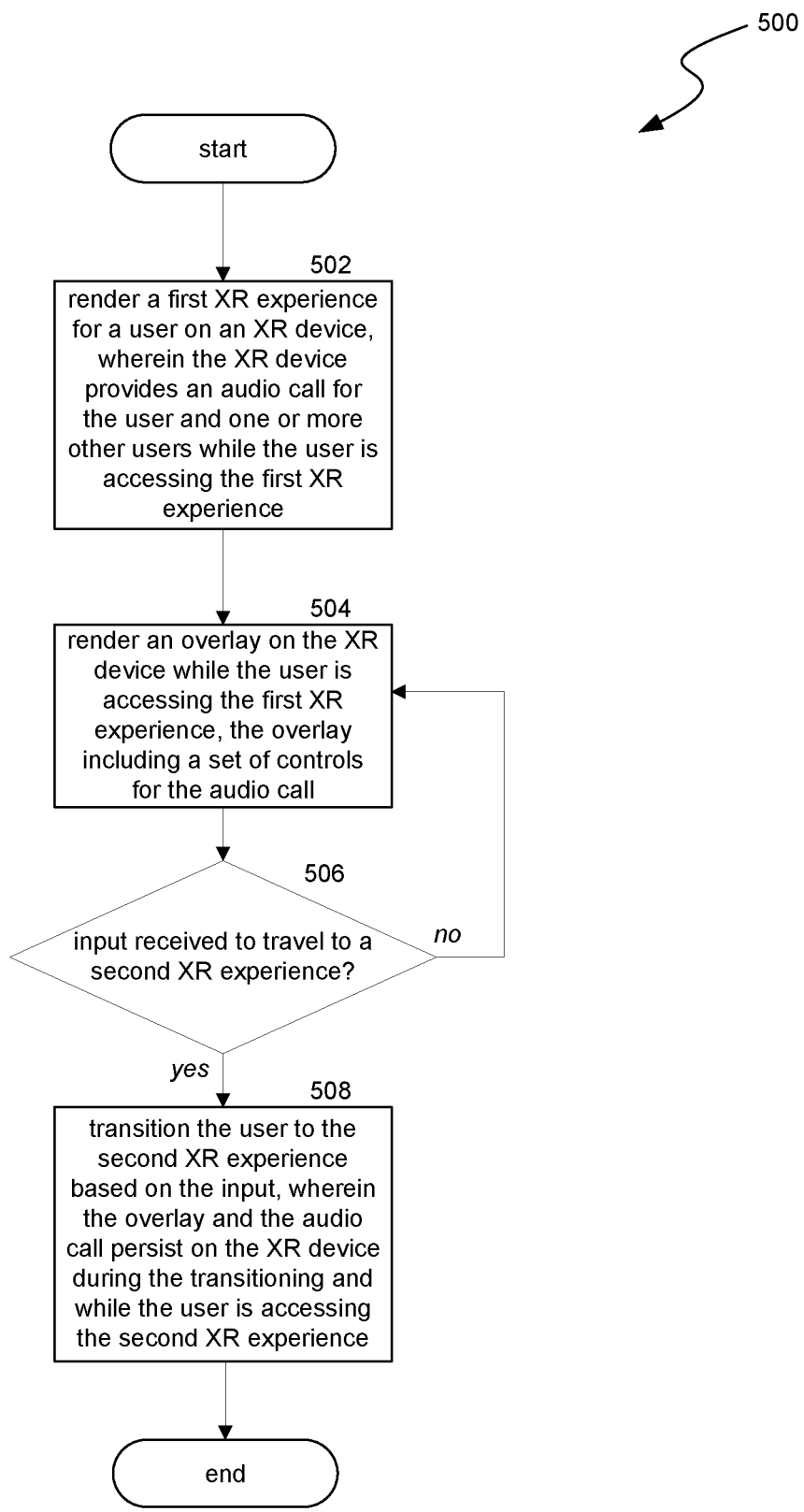
FIG. 5 is a flow diagram illustrating a process used in some implementations of the present technology for orchestrating calls and user interactions, with a persistent call control user interface element, in an artificial reality environment.

FIG. 5 is a flow diagram illustrating a process 500 used in some implementations for orchestrating calls and user interactions, with a persistent call control user interface element, in an artificial reality (XR) environment. In some implementations, process 500 can be performed as a response to a user initiating and/or joining an audio call on an XR device. In some implementations, process 500 can be performed as a response to a user joining a party with one or more other users via respective XR devices. In some implementations, process 500 can be performed as a response to a user joining an XR experience within a pre-formed party. In some implementations, some or all of process 500 can be performed by an XR head-mounted display (HMD), such as XR HMD 200 of FIG. 2A and/or XR HMD 252 of FIG. 2B. In some implementations, some or all of process 500 can be performed by another XR device in an XR system other than an XR HMD, which, in some implementations, can be in operable communication with an XR HMD, such as external processing components.

At block 502, process 500 can render a first XR experience for a user on an XR device. The XR device can provide an audio call, between the user and one or more other users, while the user is accessing the first XR experience. In some implementations, the user and the one or more other users can be within a party (i.e., a formal association between the users indicating that they should be kept together in the audio call). In some implementations, at least one of the one or more users can be accessing a different XR experience than the first XR experience while participating in the audio call. In some implementations, at least one of the one or more users can be accessing the first XR experience along with the user of the XR device. In some implementations, the one or more users can include a user accessing an XR experience from a two-dimensional (2D) interface, such as a computer, a tablet, a mobile phone, etc.

At block 504, process 500 can render an overlay on the XR device while the user is accessing the first XR experience. The overlay can include a set of controls for the audio call between the user and the one or more other users, i.e., the overlay can be a call control user interface element as described herein. In some implementations, the overlay can be in a minimized state, i.e., shown as icons corresponding to the set of controls for the audio call. In some implementations, the overlay can be in a maximized state, i.e., showing more detailed information about the audio call, its participants, further controls for the audio call, etc., as shown and described with respect to FIG. 6B herein.

In some implementations, the set of controls can display identifiers of the one or more other users, e.g., the users' names, the user's usernames, etc. In some implementations, the set of controls can display identifiers for which XR experience the one or more users are accessing. In some implementations, the set of controls can allow the user to mute or unmute their microphone. In some implementations, the set of controls can allow the user to adjust the volume of the audio call on the XR device. In some implementations, the set of controls can allow the user to end the audio call on the XR device. In some implementations, the set of controls can allow the user to adjust balance of audio output from an XR experience and audio from an audio call. In some implementations, the set of controls can allow the user to specify whether the audio captured by their XR device should be heard on the audio call and/or in the XR experience. In some implementations, the set of controls can allow the user to share a view displayed on the XR device with another user within the audio call via their own respective XR device. An exemplary set of controls are shown and described with respect to FIGS. 6A-6D.

In some implementations, the overlay can include one or more avatars corresponding to one or more of the other users in the audio call. The avatars can be rendered as two-dimensional (2D) or three-dimensional (3D) virtual objects on the XR device. In some implementations, the avatars can be graphical representations of users within the audio call. Although avatars can be created based on fictional characteristics, users within the audio call can create their avatars to reflect their real-world physical traits, such as their face shape, skin tone, eye color, hair color, body type, and the like. To provide a further customizable experience, users within the audio call can further personalize their avatars to reflect their unique styles, such as by selection of clothing and accessories. Thus, users in the audio call can create their avatars to be highly customized expressions of themselves.

In some implementations, avatars can be static or moveable to a variety of different poses, positions, and gestures. For example, in some implementations, process 500 can render movement of the avatars on the XR device corresponding to speaking by respective users, of the one or more users, in the audio call, e.g., by showing movement of the mouth while the user is speaking, based on actual movement of the mouth captured by cameras integral with or in operable communication with respective XR devices. In some implementations, process 500 can render movement of the avatars on the XR device based on predicted movement of the mouth (and, in some implementations, the body) using the speech audio, e.g., the words spoken, emphasized spoken words, emotions associated with the spoken words, etc. In some implementations, process 500 can render movement of the avatars on the XR device corresponding to other movements of the users in the audio call, such as hand gestures, turning movements, eye movements, face movements, expressions, etc., as captured by one or more cameras on or in operable communication with the respective other XR devices. Exemplary avatars of users in an audio call are shown and described with respect to FIG. 6B.

In some implementations, process 500 can display options for inviting other users to join the user in the first XR experience. An exemplary option to invite users to join a user in an XR experience is shown and described with respect to FIG. 6B. Upon selection of the option, by the user, to invite another user to the first XR experience, process 500 can transmit the invitation to the other user's respective XR device, e.g., as a pop-up on the XR environment or experience accessed by the other user. Upon receipt of the invitation, the other user can accept or decline the invitation, and respectively either join the first XR experience with the user, or remain in their current XR experience. In some implementations, the other user can proactively join the user in the first XR experience by selection of an option on a corresponding overlay displayed on the other user's respective XR device. In some implementations, upon the other user joining the first XR experience, the first XR experience can include an avatar of the other user as displayed on the user's XR device, and as shown and described with respect to FIG. 6C herein.

At block 506, process 500 can determine whether input has been received, from the user via the XR device, to travel to a second XR experience. In some implementations, the input can be acceptance of an invitation, generated by another user within the audio call, to travel to the second XR experience. In some implementations, the input to initiate travel to the second XR experience can be activation of a portal by the XR device. The portal can be, for example, a virtual doorway, a selectable virtual object (e.g., a virtual button), a virtual gate, or any other virtual entrance, object, or text indicative of virtual travel to the second XR experience. In some implementations, the portal can be rendered and displayed within the first XR experience in response to a request by the XR device and/or one or more of the other XR devices within the audio call. In some implementations, the portal can be rendered and displayed to all of the XR devices within the audio call. In some implementations, the portal can be rendered and displayed to only some of the XR devices within the audio call, e.g., XR devices associated with users who are friends of the requesting XR device, XR devices associated with users in the first XR experience, etc., and in some implementations, can only be displayed for a threshold amount of time.

In some implementations, process 500 can activate the portal by receiving a user selection of the portal. For example, the user can make a gesture corresponding to selection of the portal that is captured by one or more cameras integral with or in operable communication with the XR device, e.g., a point-and-tap motion at the location in the XR environment corresponding to the portal. In some implementations, the user can physically walk through a virtual location corresponding to a virtual doorway. In some implementations, process 500 can alternatively or additionally detect the gesture using one or more electromyography (EMG) sensors and/or using one or more sensors of an inertial measurement unit (IMU), which can be included in a wearable device (e.g., a smart wristband). In another example, the user can use one or more controllers (e.g., controller 276A and/or controller 276B of FIG. 2C) to cast a virtual hand or virtual ray into the XR environment, pointed at the portal, and use a physical button on the controller to select the virtual button. In still another example, the input can be an audible announcement captured by one or more microphones integral with or in operable communication with the XR device (e.g., by the user stating, "I want to travel to Farmland now!").

In some implementations, the virtual button or portal can include a preview of the second XR experience. For example, the portal can include a snapshot of the second XR experience, a name of the second XR experience, a description of the second XR experience, who created the portal, etc. In some implementations, the portal can further include a countdown of how long the portal is available, i.e., how long users have to request travel to the second XR experience, if such a portal is temporary.

In some implementations, process 500 can display the portal to the second XR experience based on an explicit user request to generate the portal. For example, a user can open a virtual menu of XR experiences displaying portals (e.g., virtual links) to different XR experiences, including the second XR experience. In some implementations, process 500 can display the portal to the second XR experience automatically. For example, process 500 can display the portal as a response to another user, within the audio call, traveling to the second XR experience. In still another example, process 500 can display the portal automatically based on predicted or recommended travel to the second XR experience, such as by the user of the XR device entering a guardian (e.g., a physical boundary) or physical space (e.g., a room) associated with the second XR experience, e.g., the last XR experience accessed within that guardian or physical space, the XR experience typically accessed within that guardian or physical space, the XR experience having attributes in common with that guardian or physical space (e.g., an XR work space experience for a physical office or desk), etc. An exemplary portal to travel to a second XR experience, displayed on a maximized overlay having a set of controls for an audio call, is shown and described with respect to FIG. 6B.

Figure 6A:
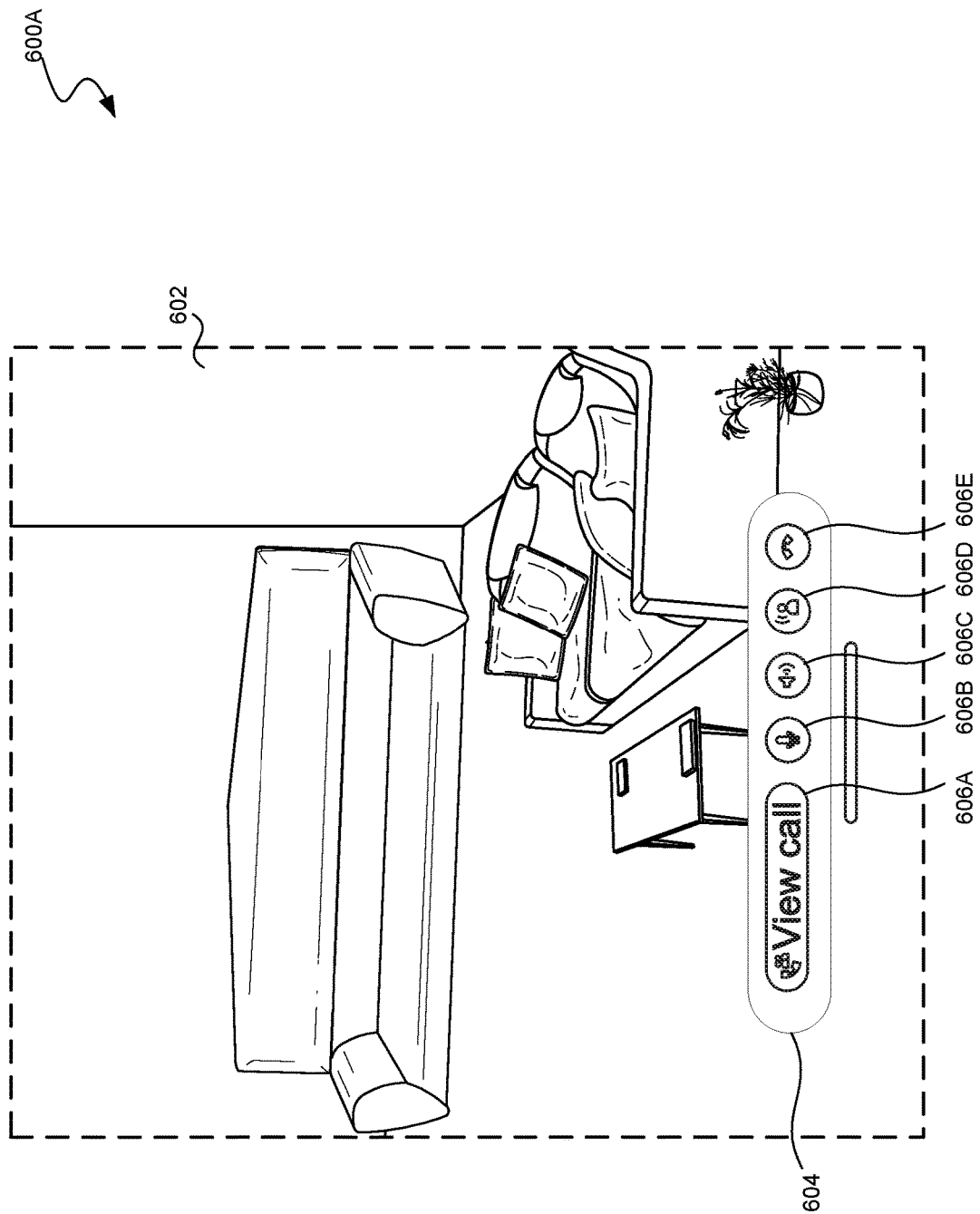
FIG. 6A is a conceptual diagram illustrating an example view on an artificial reality device of a minimized call control user interface element overlaid on a view of a first artificial reality experience.

If input has not been received to travel to a second XR experience, process 500 can return to block 504, and continue rendering the overlay on the XR device while the user is accessing the first XR experience, such as is shown and described with respect to FIG. 6A. If input has been received to travel to a second XR experience, process 500 can proceed to block 508. At block 508, process 500 can transition the user to the second XR experience based on the input. The overlay and the audio call can persist on the XR device during the transitioning and while the user is accessing the second XR experience. In some implementations, the user can transition to the second XR experience alone, i.e., without any other users of the one or more other users. In some implementations, however, the user can transition to the second XR experience with some or all of the one or more other users, such as is shown and described herein with respect to FIG. 6C. In some implementations, at least one of the one or more other users can transition to the second XR experience from the first XR experience with the user. In some implementations, at least one of the one or more other users can transition to the second XR experience from a different XR experience than the user. Similar to the first XR experience, in some implementations, other users on the audio call can join the second XR experience based on acceptance of an invitation from the user (or other users in the audio call within the second XR experience), and/or can proactively join the second XR experience via selection of an option from the overlay.

In some implementations, while the overlay is displayed on the XR device (e.g., while the audio call is in progress, which can be across various XR experiences), process 500 can receive input corresponding to the overlay in order to control the audio call. For example, process 500 can receive input via the set of controls on the overlay to invite a user in the audio call to join an XR experience, invite a user to join the audio call, mute of unmute the microphone, adjust the volume of the audio call, end the audio call, specify whether the audio captured by the XR device should be heard on the audio call and/or in the XR experience, etc. In some implementations, based on the set of controls included in the overlay, process 500 can further balance audio output from A) the XR experience being accessed, and B) the audio call. An exemplary dashboard for adjusting audio output settings is shown and described herein with respect to FIG. 6D.

Although shown and described with respect to first and second XR experiences, it is contemplated that a user can travel and/or remain within any number of one or more XR experiences, and that the overlay and audio call can persist on the XR device. Further, it is contemplated that the overlay and audio call can persist on the XR device while other users within the audio call travel and/or remain within any number of one or more of the same or different XR experiences. For example, the user can stay within the first XR experience, and blocks 502-506 can be repeated until process 500 ends. In another example, the user can travel to a third (or further) XR experience, and blocks 506-508 can repeat until process 500 ends.

In some implementations, process 500 can end when the audio call is terminated, e.g., when the user explicitly terminates the audio call on the XR device via the set of controls on the overlay. In some implementations, process 500 can end when all of the participants of the audio call leave the audio call. In some implementations, process 500 can end when the user of the XR device is no longer accessing an XR experience. In some implementations, process 500 can end when the user deactivates or removes the XR device, and/or the XR device is otherwise no longer executing.

FIG. 6A is a conceptual diagram illustrating an example view 600A on an artificial reality (XR) device of a minimized call control user interface element 604 overlaid on a view of a first XR experience 602. As used herein, minimized call control user interface element 604 can be an overlay having a set of controls 606A-E for controlling an audio call, in some implementations. In example view 600A, first XR experience 602 can be an XR home experience that the user of the XR device is accessing. Minimized call control user interface element 604 can include control 606A for viewing the audio call (e.g., maximizing options for viewing and/or controlling the audio call), control 606B for muting or unmuting the microphone on the XR device, control 606C for controlling the volume on the XR device, control 606D for controlling audio options, and control 606E to terminate the audio call. Although described herein as having particular call controls 606A-E, it is contemplated that minimized call control user interface element 604 can include any of the controls described herein, and/or any other call controls typically used for a group call.

Figure 6B:
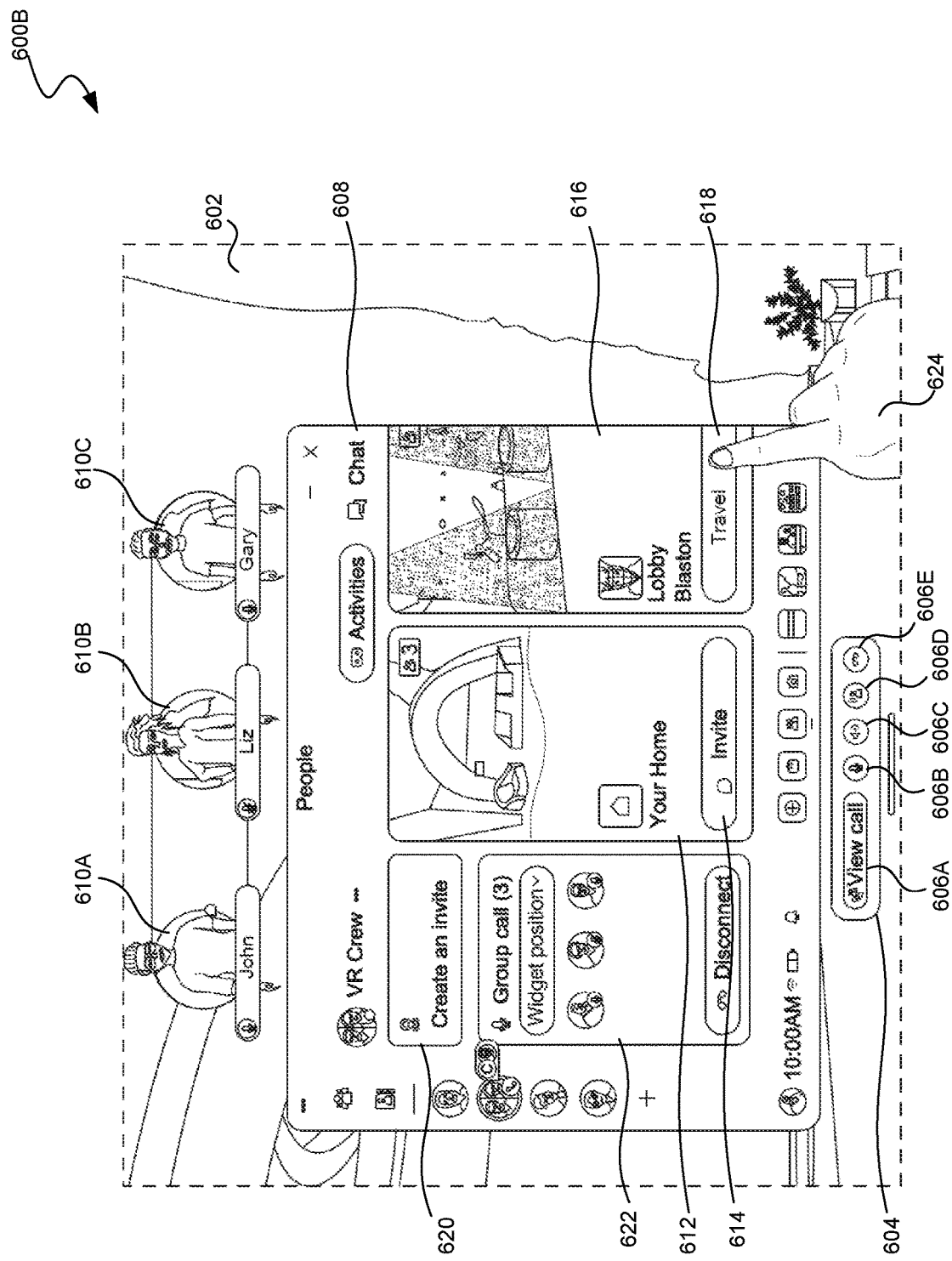
FIG. 6B is a conceptual diagram illustrating an example view on an artificial reality device of a maximized call control user interface element overlaid on a view of a first artificial reality experience.

FIG. 6B is a conceptual diagram illustrating an example view 600B on an artificial reality (XR) device of a maximized call control user interface element 608 overlaid on a view of a first XR experience. As used herein, minimized call control user interface element 604 and/or maximized call control user interface element 608 can collectively or separately comprise an overlay having a set of controls 606A-E, 614, 618, 620 for controlling an audio call, in some implementations. As shown in example view 600B, minimized call control user interface element 604 and maximized call control user interface element 608 can be separated from each other in example view 600B in some implementations, and do not have to persist together. For example, minimized call control user interface element 604 can persist on the XR device as long as the audio call is occurring, while maximized call control user interface element 608 can be opened and closed separately from minimized call control user interface element 604.

From example view 600A of FIG. 6A, the user of the XR device can, for example select control 606A to view the audio call, i.e., to display maximized call control user interface element 608. Maximized call control user interface element 608 can include a display 622 of users within the audio call. Maximized call control user interface element 608 can further include a control 620 to create an invitation to the audio call for users not currently within the audio call. Maximized call control user interface element 608 can include avatars 610A-C representative of users within the audio call, which, in some implementations, can be animated based on their respective spoken audio and/or movements as captured by their respective XR devices, as described further herein.

Maximized call control user interface element 608 can include a preview 612 of first XR experience 602 in which the user is located. From preview 612 of first XR experience 602, the user of the XR device can select control 614 to invite user(s) in the audio call to first XR experience 602. Maximized call control user interface element 608 can further include preview 616 of second XR experience 626. From preview 616 of second XR experience 626, the user of the XR device can select control 618 to travel to second XR experience 626. The user of the XR device can select control 618 to travel to second XR experience 626 via, for example, her physical or virtual hand 624, as described further herein.

Figure 6C:
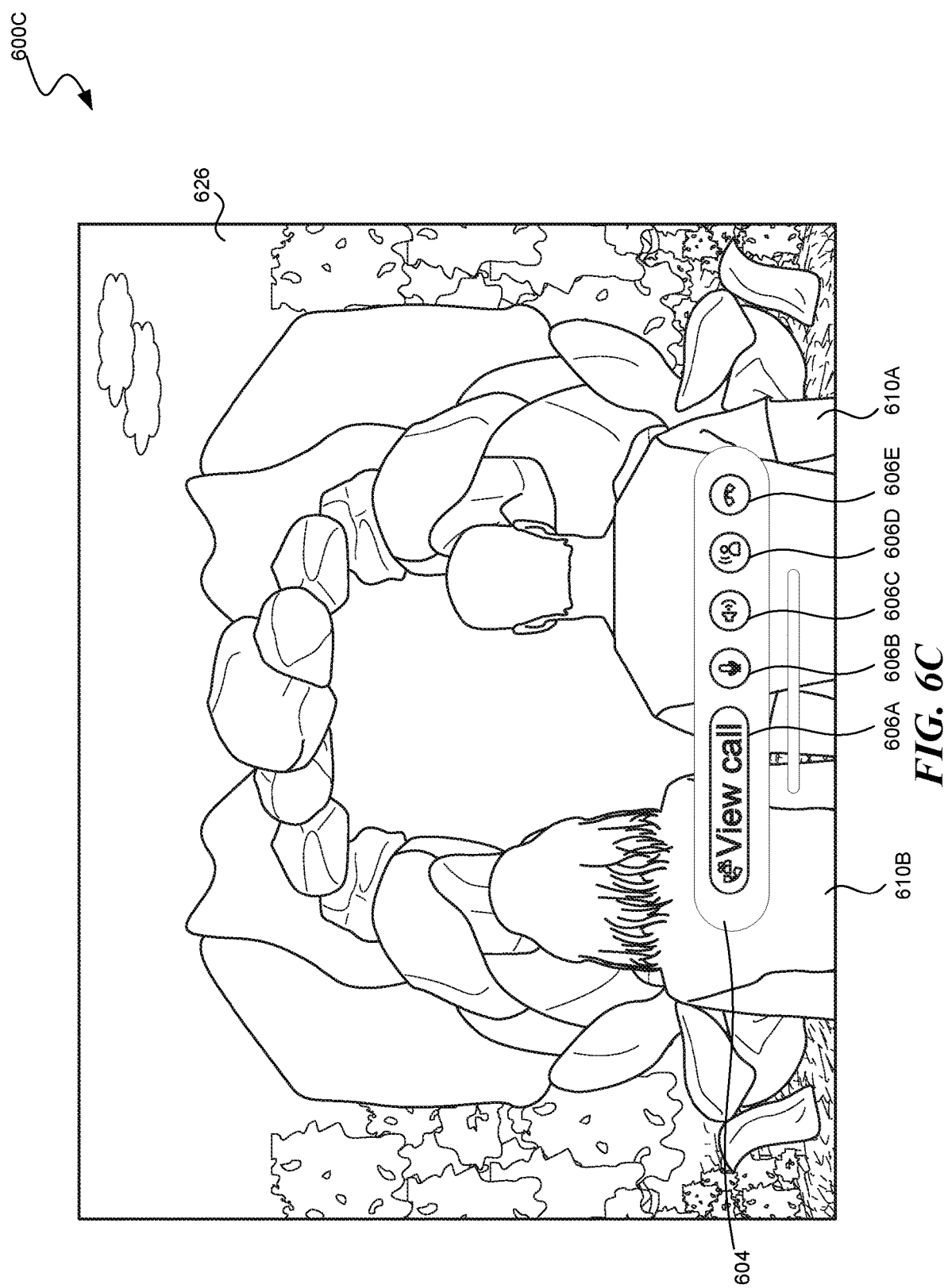
FIG. 6C is a conceptual diagram illustrating an example view on an artificial reality device of a minimized call control user interface element persisting into a second artificial reality experience.

FIG. 6C is a conceptual diagram illustrating an example view 600C on an artificial reality (XR) device of a minimized call control user interface element 604 persisting into a second XR experience 626. From example view 600B of FIG. 6B, the user of the XR device can select control 618 to travel to second XR experience 626, thereby generating example view 600C of second XR experience 626. In some implementations the users associated with avatars 610A-B can further select to travel to second XR experience 626, e.g., via selection of an option from a corresponding maximized call control user interface element on their respective XR devices, via selection of a portal, via acceptance of an invitation to transition to second XR experience 626, etc. Thus, avatars 610A-B can be displayed in example view 600C within second XR experience 626. As shown in FIGS. 6A-6C, minimized call control user interface element 604 can persist throughout the user's access of first XR experience 602, while transitioning between first XR experience 602 and second XR experience 626, and within second XR experience 626. Further, the audio call can persist with the users shown in the audio call via display 622 of FIG. 6B. For example, although the user associated with avatar 610C did not travel to second XR experience 626, he can still remain within the audio call with the user of the XR device, the user associated with avatar 610A, and the user associated with avatar 610B.

Figure 6D:
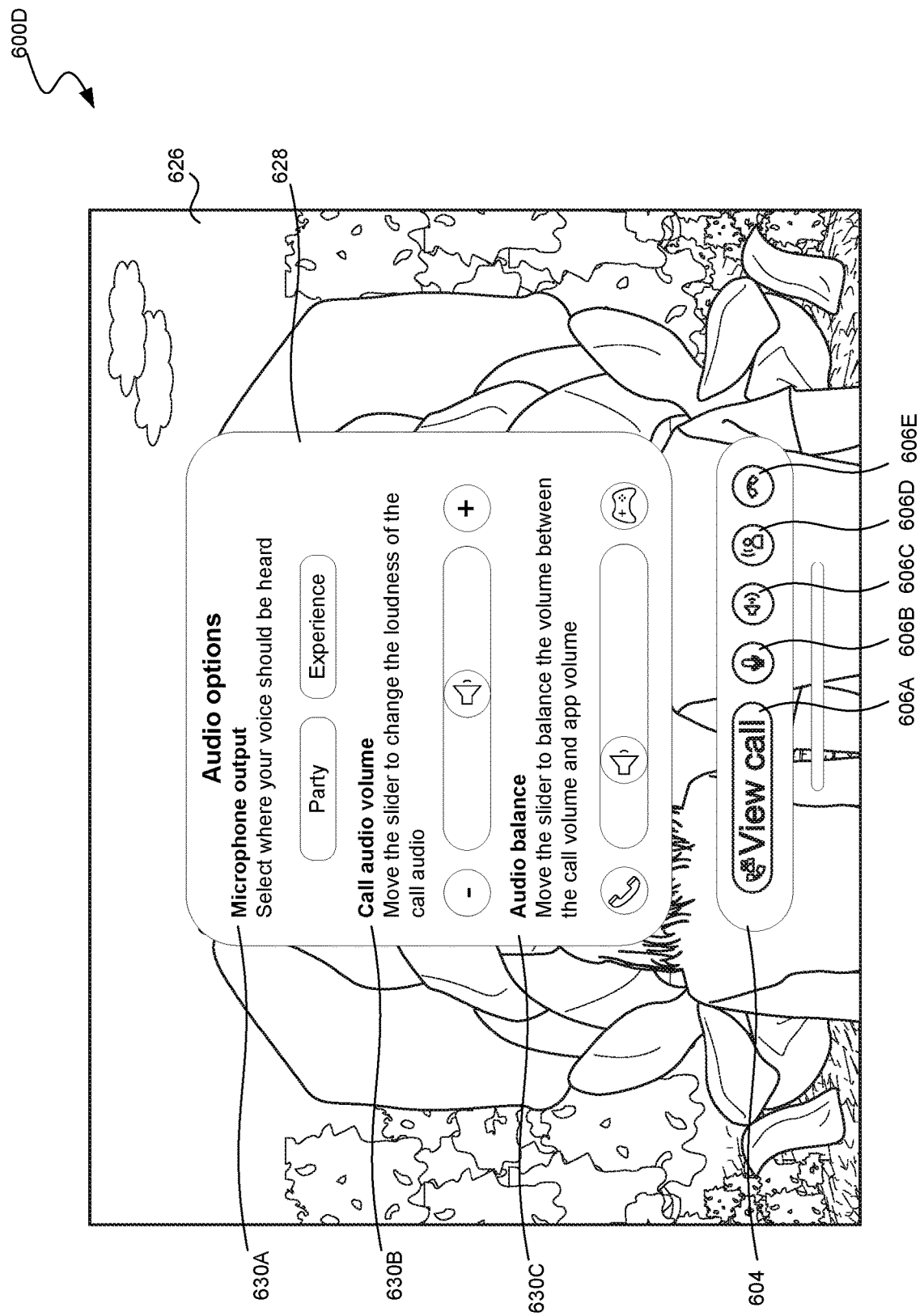
FIG. 6D is a conceptual diagram illustrating an example view on an artificial reality device of audio control options maximized from a minimized call control user interface element overlaid on a view of a second artificial reality experience.

FIG. 6D is a conceptual diagram illustrating an example view 600D on an artificial reality (XR) device of audio control options 628 maximized from a minimized call control user interface element 604 overlaid on a view of a second XR experience 626. As used herein, minimized call control user interface element 604 and/or maximized audio control options 628 can collectively or separately comprise an overlay having a set of controls 606A-E, 630A-C for controlling an audio call, in some implementations. From example view 600C of FIG. 6C, the user of the XR device can select control 606D for controlling audio options. Upon selection of control 606D, the XR device can render example view 600D with maximized audio control options 628. In some implementations, maximized audio control options 628 can include control 630A, which can allow the user to select where audio captured by her microphone is output, e.g., in the audio call (party) and/or in second XR experience 626. Maximized audio control options 628 can further include, in some implementations, call audio volume control 630B that can allow the user to change the loudness of the call audio. In some implementations, maximized audio control options 628 can further include control 630C for controlling the audio volume balance between the audio call and second XR experience 626.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for orchestrating calls and user interactions, with a persistent call control user interface element, in an artificial reality environment, the method comprising:
rendering a first artificial reality experience for a user on an artificial reality device, wherein the artificial reality device provides an audio call, between the user and one or more other users on respective other artificial reality devices, while the user is accessing the first artificial reality experience,
wherein at least one of the one or more other users is accessing, via at least one respective other artificial reality device of the respective other artificial reality device, a different artificial reality experience than the first artificial reality experience, while the user is accessing the first artificial reality experience;
rendering an overlay on the artificial reality device while the user is accessing the first artificial reality experience, the overlay including a set of controls for the audio call between the user and the one or more other users, wherein the set of controls includes controls that A) identify the one or more other users, and B) share a view displayed on the artificial reality device with the at least one of the one or more other users via the respective at least one other artificial reality devices;
receiving input, from the user via the artificial reality device, to travel to a second artificial reality experience;
transitioning the user to the second artificial reality experience based on the input, wherein the overlay and the audio call persist on the artificial reality device during the transitioning and while the user is accessing the second artificial reality experience; and
balancing audio output from the second artificial reality experience and the audio call, while the user is accessing the second artificial reality experience, based on input received via the set of controls included in the overlay.

2. The method of claim 1, further comprising:
generating an invitation via the overlay to join the user in the first artificial reality experience, the invitation being transmitted to the at least one of the one or more other users via the at least one respective other artificial reality device.

3. The method of claim 1,
wherein at least one second other user, of the one or more other users, is accessing the first artificial reality experience while the user is accessing the first artificial reality experience, and
wherein the at least one second other user automatically transitions to the second artificial reality experience C) in response to the user accessing the second artificial reality experience and D) based on an association, formed via the overlay, between the user and the at least one second other user.

4. The method of claim 1, wherein the user and the one or more other users transition, together to the second artificial reality experience, based on acceptance of invitations, provided via the overlay to other overlays on respective other artificial reality devices corresponding to the one or more other users, to travel to the second artificial reality experience.

5. The method of claim 1,
wherein the at least one, of the one or more other users, is accessing the second artificial reality experience while the user is accessing the first artificial reality experience, and
wherein the input to travel to the second artificial reality experience is acceptance of an invitation, initiated by an other user of the at least one of the one or more other users, to travel to the second artificial reality experience.

6. The method of claim 1,
wherein the at least one, of the one or more other users, is accessing the second artificial reality experience while the user is accessing the first artificial reality experience, and
wherein the input to travel to the second artificial reality experience is selection of an option by the user to join an other user, of the at least one of the one or more other users, in the second artificial reality experience.

7. The method of claim 1, wherein the overlay includes avatars corresponding to respective users of the one or more other users in the audio call.

8. The method of claim 7, wherein automatic animation of faces of the avatars corresponds to speaking by respective users, of the one or more other users, in the audio call.

9. The method of claim 1, wherein the set of controls further includes at least one of C) muting or unmuting a microphone on the artificial reality device for the audio call, D) adjusting volume of the audio call on the artificial reality device, E) ending the audio call on the artificial reality device, or F) any combination thereof.

10. The method of claim 1, wherein the overlay is minimized to icons corresponding to the set of controls for the audio call.

11. A non-transitory computer-readable storage medium storing instructions that, when executed by a computing system, cause the computing system to perform a process for orchestrating calls and user interactions, with a persistent call control user interface element, in an artificial reality environment, the process comprising:
rendering a first artificial reality experience for a user on an artificial reality device, wherein the artificial reality device provides an audio call, between the user and one or more other users on respective other artificial reality devices, while the user is accessing the first artificial reality experience,
  wherein at least one of the one or more other users is accessing, via at least one respective other artificial reality device of the respective other artificial reality devices, a different artificial reality experience than the first artificial reality experience, while the user is accessing the first artificial reality experience;
rendering an overlay on the artificial reality device while the user is accessing the first artificial reality experience, the overlay including a set of controls for the audio call between the user and the one or more other users;
receiving input, from the user via the artificial reality device, to travel to a second artificial reality experience; and
transitioning the user to the second artificial reality experience based on the input, wherein the overlay and the audio call persist on the artificial reality device during the transitioning and while the user is accessing the second artificial reality experience.

12. The non-transitory computer-readable storage medium of claim 11, wherein the set of controls includes at least one of A) controls that identify of the one or more other users, B) controls that share a view displayed on the artificial reality device with the at least one of the one or more other users via the at least one respective other artificial reality devices, C) controls that mute or unmute a microphone on the artificial reality device for the audio call, D) controls that adjust volume of the audio call on the artificial reality device, E) controls that end the audio call on the artificial reality device, or F) any combination thereof.

13. The non-transitory computer-readable storage medium of claim 11, wherein the process further comprises:
  balancing audio output from the second artificial reality experience and the audio call, while the user is accessing the second artificial reality experience, based on input received via the set of controls included in the overlay.

14. The non-transitory computer-readable storage medium of claim 11, wherein the process further comprises:
  generating an invitation via the overlay to join the user in the first artificial reality experience, the invitation being transmitted to the at least one of the one or more other users via the at least one respective other artificial reality device.

15. A computing system for orchestrating calls and user interactions, with a persistent call control user interface element, in an artificial reality environment, the computing system comprising:
  one or more processors; and
  one or more memories storing instructions that, when executed by the one or more processors, cause the computing system to perform a process comprising:
    rendering a first artificial reality experience for a user on an artificial reality device, wherein the artificial reality device provides an audio call, between the user and one or more other users on respective other artificial reality devices, while the user is accessing the first artificial reality experience,
      wherein at least one of the one or more other users is accessing, via at least one respective other artificial reality device of the respective other artificial reality devices, a different artificial reality experience than the first artificial reality experience, while the user is accessing the first artificial reality experience;
    rendering an overlay on the artificial reality device while the user is accessing the first artificial reality experience, the overlay including a set of controls for the audio call between the user and the one or more other users;
    receiving input, from the user via the artificial reality device, to travel to a second artificial reality experience; and
    transitioning the user to the second artificial reality experience based on the input, wherein the overlay and the audio call persist on the artificial reality device during the transitioning and while the user is accessing the second artificial reality experience.

16. The computing system of claim 15, wherein the process further comprises:
  balancing audio output from the second artificial reality experience and the audio call, while the user is accessing the second artificial reality experience, based on input received via the set of controls included in the overlay.

17. The computing system of claim 15, wherein the overlay includes avatars corresponding to respective users of the one or more other users in the audio call.

18. The computing system of claim 17, wherein automatic animation of parts of the avatars corresponds to speaking by respective users, of the one or more other users, in the audio call.

* * * * *